(12) United States Patent
Zhen et al.

(10) Patent No.: US 8,279,111 B2
(45) Date of Patent: Oct. 2, 2012

(54) DISTANCE MEASURING SYSTEM

(75) Inventors: Bin Zhen, Tokyo (JP); Huan-Bang Li, Tokyo (JP); Ryuji Kohno, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 644 days.

(21) Appl. No.: 12/223,923

(22) PCT Filed: Feb. 9, 2007

(86) PCT No.: PCT/JP2007/052404
§ 371 (c)(1),
(2), (4) Date: Oct. 28, 2009

(87) PCT Pub. No.: WO2007/094266
PCT Pub. Date: Aug. 23, 2007

(65) Prior Publication Data
US 2010/0231435 A1    Sep. 16, 2010

(30) Foreign Application Priority Data

Feb. 13, 2006   (JP) ................................. 2006-035724

(51) Int. Cl.
*G01S 13/74*    (2006.01)
*G01S 13/08*    (2006.01)
*G01S 13/00*    (2006.01)

(52) U.S. Cl. ............... 342/125; 342/42; 342/46; 342/47; 342/118; 342/165; 342/173; 342/174; 342/175; 342/195

(58) Field of Classification Search ............ 342/21, 342/29–51, 118, 125, 145, 175, 195, 165, 342/173, 174, 450–465; 375/130–153
See application file for complete search history.

(56) References Cited

U.S. PATENT DOCUMENTS

| | | | | |
|---|---|---|---|---|
| 3,035,261 A | * | 5/1962 | Emile | 342/30 |
| 3,264,644 A | * | 8/1966 | Jacob | 342/125 |
| 3,461,452 A | * | 8/1969 | Welter | 342/125 |
| 3,530,467 A | * | 9/1970 | Attwood et al. | 342/125 |
| 3,659,292 A | * | 4/1972 | Low et al. | 342/125 |
| 3,900,873 A | * | 8/1975 | Bouvier et al. | 342/125 |
| 4,278,977 A | * | 7/1981 | Nossen | 342/42 |
| 4,297,700 A | * | 10/1981 | Nard et al. | 342/125 |

(Continued)

FOREIGN PATENT DOCUMENTS

JP    7 181273    7/1995

(Continued)

OTHER PUBLICATIONS

Roberts, Rick, "Ranging Subcommittee Final Report", IEEE 802.15 WPAN Documents, pp. 1-37, Nov. 2004.

(Continued)

*Primary Examiner* — Bernarr Gregory
(74) *Attorney, Agent, or Firm* — Jacobson Holman PLLC

(57) ABSTRACT

A high-precision distance measuring with a reduced error in a distance measuring system which calculates a distance from an arrival time of each pulse signal constituting a pulse sequence is provided. For an oscillator which generates pulse signals by counting the number of pulse signals constituting a received pulse sequence, a relative time difference between a transmitting device and a return device is acquired, a distance from the transmitting device to the return device is calculated, and the calculated distance is corrected based on the calculated relative time difference.

4 Claims, 10 Drawing Sheets

U.S. PATENT DOCUMENTS

| | | | |
|---|---|---|---|
| 4,357,609 A * | 11/1982 | Spencer | 342/125 |
| 4,513,285 A * | 4/1985 | Pike et al. | 342/125 |
| 4,757,315 A * | 7/1988 | Lichtenberg et al. | 342/125 |
| 5,194,869 A * | 3/1993 | Kochiyama et al. | 342/125 |
| 5,381,444 A * | 1/1995 | Tajima | 342/125 |
| 6,078,786 A * | 6/2000 | Wandernoth et al. | 342/118 |
| 6,295,019 B1 * | 9/2001 | Richards et al. | 342/125 |
| 6,614,387 B1 * | 9/2003 | Deadman | 342/125 |
| 6,670,909 B2 * | 12/2003 | Kim | 342/50 |
| 6,674,396 B2 * | 1/2004 | Richards et al. | 342/125 |
| 6,795,491 B2 * | 9/2004 | Fleming et al. | 342/125 |
| 6,922,166 B2 * | 7/2005 | Richards et al. | 342/125 |
| 7,002,510 B1 * | 2/2006 | Choate et al. | 342/118 |
| 7,075,476 B2 * | 7/2006 | Kim | 342/50 |
| 7,295,159 B1 * | 11/2007 | Belcea et al. | 342/465 |
| 7,339,525 B2 * | 3/2008 | Zimmerman et al. | 342/464 |
| 7,342,538 B2 * | 3/2008 | Zimmerman | 342/464 |
| 7,345,627 B2 * | 3/2008 | Zimmerman et al. | 342/464 |
| 7,372,403 B2 * | 5/2008 | Fullerton et al. | 342/450 |
| 7,382,318 B2 * | 6/2008 | Zimmerman et al. | 342/464 |
| 7,504,991 B2 * | 3/2009 | Li et al. | 342/118 |
| 2004/0235499 A1 | 11/2004 | Tanaka et al. | |
| 2006/0214841 A1 | 9/2006 | Li et al. | |

FOREIGN PATENT DOCUMENTS

| | | |
|---|---|---|
| JP | 2000 68895 | 3/2000 |
| JP | 2003 270369 | 9/2003 |
| JP | 2004 258009 | 9/2004 |
| JP | 2006 250777 | 9/2006 |
| JP | 2006 317213 | 11/2006 |

OTHER PUBLICATIONS

Brethour, Vern, "Two Way Ranging Using Tracking Information to Manage Crystal Offsets", IEEE 802.15 WPAN Documents, pp. 1-14, Jun. 2005.

Hach, Rainer, "Symetric Double Sided—Two Way Ranging", IEEE 802.15 WPAN Documents, pp. 1-9, Jun. 2005.

* cited by examiner

DISTANCE MEASURING SYSTEM

This is a national stage of PCT/JP07/052,404 filed Feb. 9, 2007 and published in Japanese.

BACKGROUND OF THE INVENTION

1. Field of the Invention

The present invention relates to a distance measuring system which measures the distance between two different points based on an arrival time difference of pulse signals.

2. Description of the Related Art

There has been proposed a distance measuring system which uses radio waves as a so-called ranging method of measuring the distance between two different points.

In the distance measuring system, as shown in FIG. 8, for example, when measuring a distance 1 from a point F to a point G is desired, a transmitting device 61 and a receiving device 62 are respectively placed at the point F and the point G as radio stations. Then, the transmitting device 61 transmits a radio wave comprised of pulse signals, and the receiving device 62 receives the radio wave. At this time, an arrival time Td for the pulse signals transmitted from the transmitting device 61 to be received by the receiving device 62 is measured. The distance 1 can be calculated by multiplying the measured arrival time Td by a propagation velocity Vc of the radio wave. Because the propagation velocity Vc of the radio wave is constant, the distance 1 can be measured accurately by measuring only the arrival time Td.

As a method of measuring the propagation time Td, there has been proposed a method which uses spectral spread technique of measuring a distance between radio devices at a phase timing of a spread code in transmission and reception in addition to a method of measuring a time at which the pulse signals zero-cross, a method of measuring the arrival time Td by identifying a phase difference between the pulse signals.

FIG. 9 shows the configuration of a conventional system using the spectral spread technique. The system measures a distance d between a radio device 71 and a radio device 72 which are located at two different points, and is configured so that the radio device 71 includes a transmission section 82 which transmits a signal comprised of a pulse sequence or the like, an antenna 83 connected to the transmission section 82, an antenna 84 for receiving a radio wave from the radio device 72, a reception section 85 connected to the antenna 84, a correlation calculating section 86 connected to the reception section 85, a correlation position determining section 87 connected to the correlation calculating section 86, and finally a distance measuring section 88 connected to the transmission section 82 and the correlation position determining section 87 to measure the distance d. A local transmission signal is supplied to the transmission section 82 and the reception section 85 from the local oscillator 81.

The radio device 72 includes an antenna 91 for receiving a radio wave transmitted from the antenna 83, a reception section 92 connected to the antenna 91, a transmission section 94 which transmits data, and an antenna 95 connected to the transmission section 94 to transmit a radio wave. A local transmission signal is supplied to the transmission section 92 and the reception section 94 from a local oscillator 93.

A signal represented by, for example, a spread code of a base band and a phase timing, is generated by the signal generating section 81 in the radio device 71, and is converted to a high-frequency signal with a center frequency f1 by the transmission section 82, and the signal is sent to the radio device 72 via the antenna 83.

In the radio device 72, a high-frequency spread code received via the antenna 91 is amplified by the reception section 92, and is converted to have a center frequency f2 by an unillustrated frequency converting section to generate a signal to be transmitted to the radio device 71, and this signal is returned to the radio device 71 via the transmission section 94. The radio device 71 receives the spread code resent via the antenna 84 and the reception section 85, and converts the high-frequency spread code to have a base band by orthogonal detection. Further, the correlation calculating section 86 performs an autocorrelation operation on the spread code, and the correlation position determining section 87 detects the phase timing of the received spread code based on an autocorrelation peak position. The distance measuring section 88 detects a difference T1 between the phase timing of the transmitted spread code and the phase timing of the received spread code to calculate the distance d between the radio devices 71 and 72. That is, the system configuration shown in FIG. 9 executes a so-called TWR (Two Way Ranging) type measurement of calculating the distance by causing signals to reciprocate between the radio devices 71 and 72, and dividing the acquired difference by two.

The transmission section 82, 94 which send a signal to be transmitted and received produces local oscillation signals by means of the local oscillator 81, 93 which comprises an oscillator to accurately keep time, and adds the local oscillation signals to produce a pulse sequence. It is therefore ideally desirable that the times kept by the local oscillator 81 and the local oscillator 93 are identical, but actually they are often deviate from each other by a unit of ppm (1/1,000,000).

FIG. 10 shows the relationship of measuring errors with respect to an offset A (ppm) of the local oscillator 81 and an offset B (ppm) of the local oscillator 93.

When there is a relative time difference of approximately 10 ppm between the local oscillator 81 and the local oscillator 93, as shown in FIG. 10, the measured distance has an error of 3 m to the actual distance.

There has also been proposed a technique of eliminating such a measuring error. In this regard, please see 1) V. Brethour, "Two Way Ranging using Tracking Information to Manage Crystal Offset," IEEE 802.15 WPAN documents, 15-05-0336-r00; 2) R. Hach, "Symmetric Double Side-Two Way Ranging," IEEE 802.15 WPAN documents, 15-05-0334-r00; and 3) R. Roberts, "Ranging Subcommittee Final Report," IEEE 802.15 WPAN documents, 15-04-0581-r07.

SUMMARY OF THE INVENTION

However, the conventional technique disclosed in the Non-patent Document 1 cannot be adapted to a case where a device which returns a received signal, like the radio device 72 in FIG. 9, is a so-called noncoherent device which does not have a local oscillator, and suffers a low versatility. In general, an noncoherent device is cheaper than a coherent device, so that noncoherent devices should be adaptable to the system as much as possible to reduce the general system cost.

Because the conventional technique disclosed in the Non-patent Document 2 requires at least three packet converting processes, complicating the system configuration, and needs greater bands and power accordingly.

Further, the conventional technique disclosed in the Non-patent Document 3 requires at least four packet converting processes, and therefore needs greater bands and power than the conventional technique disclosed in the Non-patent Document 3.

Accordingly, the present invention has been devised in view of the foregoing problems, and it is an object of the invention to provide a so-called TWR type distance measuring system which can reduce a measuring error to the order of 1/10,000 with as smaller bands and less power as possible.

To overcome the problems, a distance measuring system according to the present invention comprises a transmitting device having transmission means that transmits, as a radio wave, a pulse sequence in which pulse signals having equal amplitudes are arranged at equal time intervals, and reception means that receives the pulse sequence returned; and a return device having return means that receives the pulse sequence transmitted as a radio wave from the transmitting device and returns the pulse sequence to the transmitting device, operation means that calculates a return delay time from reception of the pulse sequence to returning of the pulse sequence, and notification means that notifies the transmitting device of the return delay time calculated by the operation means; and further includes relative time difference calculating means that acquires a relative time difference between the transmitting device and the return device for an oscillator which generates the pulse signals by counting a number of pulse signals constituting the pulse sequence received via the reception means; and distance calculating means that acquires an arrival time from transmission of one pulse signal constituting the pulse sequence by the transmission means to reception of the pulse signal by the reception means, calculates a distance from the return device based on the return delay time notified by the notification means and the acquired arrival time, and corrects the calculated distance based on the relative time difference calculated by the relative time difference calculating means.

The effect of the present invention is to provide a distance measuring system which can reduce a measuring error to the order of 1/10,000 with as smaller bands and less power as possible in a so-called TWR type distance measuring system.

DETAILED DESCRIPTION OF THE PREFERRED EMBODIMENTS

As a best mode for carrying out the present invention, a distance measuring system which measures a distance between two points based on so-called TWR (Two Way Ranging) will be described below in detail with reference to the accompanying drawings.

Figure 1:
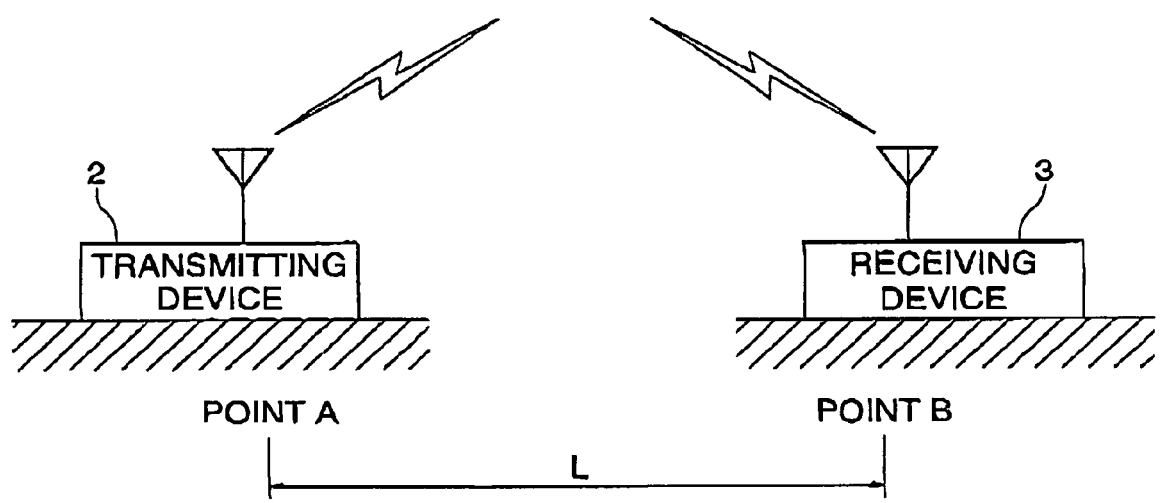
FIG. 1 shows a configurational diagram of a distance measuring system to which the present invention is adapted.

FIG. 1 shows the configuration of a distance measuring system 1 to which the present invention is adapted. The distance measuring system 1 measures a distance L from a point A to a point B, and has a transmitting device 2 located at the point A and a return device 3 located at the point B.

The transmitting device 2 and the return device 3 are radio communicating devices capable of transmitting and receiving radio waves using the UWB (Ultra Wide Band) communication technique. The UWB communication uses pulse signals with a very short time duration of one nanosecond, and changes positions on the time axis of the pulse signals and phases thereof to transfer information without using a carrier wave. As the pulse signals with a very short time duration of one nanosecond or less are used, the signal band occupied by signals for UWB communication become very wide and several GHz, modulation using a carrier wave itself becomes unnecessary. The system is not easily influenced by other narrow band communication systems or various devices. It can achieve both high data rate and low data rate transfer characteristic.

Unlike the carrier using communication systems that transmit narrow band radio waves, the UWB communication can achieve communications merely by transmitting very short pulses, thus making it possible to reduce power consumption considerably, and can achieve very fast communications by shortening the transmission intervals of pulse signals.

Figure 2:
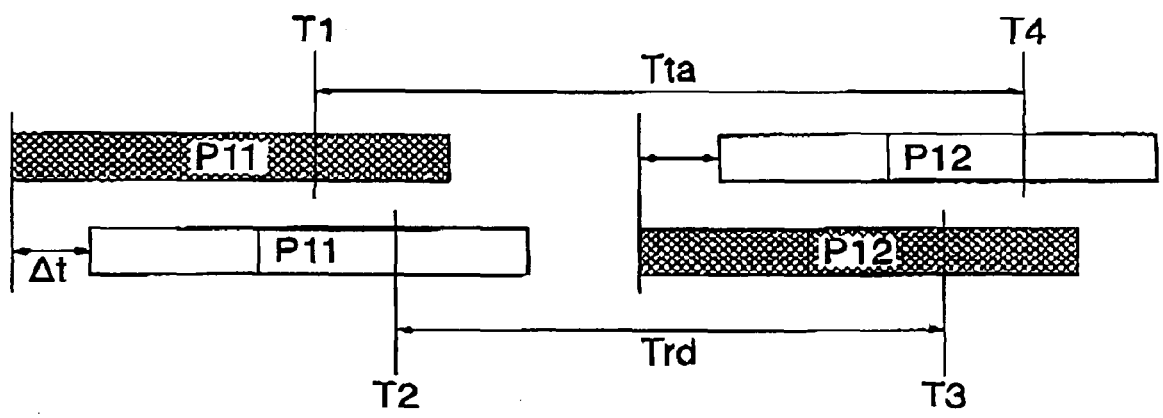
FIG. 2 is a diagram for explaining the principle of the distance measuring of the distance measuring system to which the present invention is adapted.

In case of actually measuring the distance L with the distance measuring system 1, the transmitting device 2 first transmits a packet P11 as shown in FIG. 2. The transmitted packet P11 is received by the return device 3 after a time $\Delta_t$. The return device 3 transmits a return packet P12 to the transmitting device 2 after a return delay time $T_{rd}$ after reception of the packet 11. The packet P12 is received by the transmitting device 2 after a time $\Delta_t$. The transmitting device 2 calculates the distance L based on the received packet P12.

Let T1 be a transmission time when one pulse signal in the packet P11 is transmitted from the transmitting device 2, T2 be a reception time when the one pulse signal in the packet P11 is received by the return device 3, T3 be a transmission time when one pulse signal in the packet P12 corresponding to the former one pulse signal is transmitted from the return device 3, and T4 be a reception time when the one pulse signal in the packet P12 is received by the transmitting device 2. Those transmission times and reception times are for pulse signals at an end of a preamble.

$\Delta_t$ is expressed by the following equation (1)

$$\Delta_t = \{(T2-T1)+(T4-T3)\}/2\{(T4-T1)-(T3-T2)\}/2 \qquad (1)$$

That is, T4−T1 in the equation (1) is a time $T_{ta}$ from the transmitting device 2 to receive the one pulse signal after transmission thereof, and can be measured by the transmitting device 2. T3−T2 is equivalent to the return delay time $T_{rd}$. That is, $\Delta_t$ is expressed by $(T_{ta}-T_{rd})/2$.

However, the equation (1) satisfies when there is no relative deviation in the oscillation times of the oscillators installed in the transmitting device 2 and the return device 3. The transmission time of the oscillators may fluctuate due to the temperature, load resistance or the like. That is, to eliminate a relative time difference between the oscillators in the transmitting device 2 and the return device 3, the transmitting device 2 in the distance measuring system 1 to which the present invention is adapted is newly provided with a structure to be described later.

Figure 3:
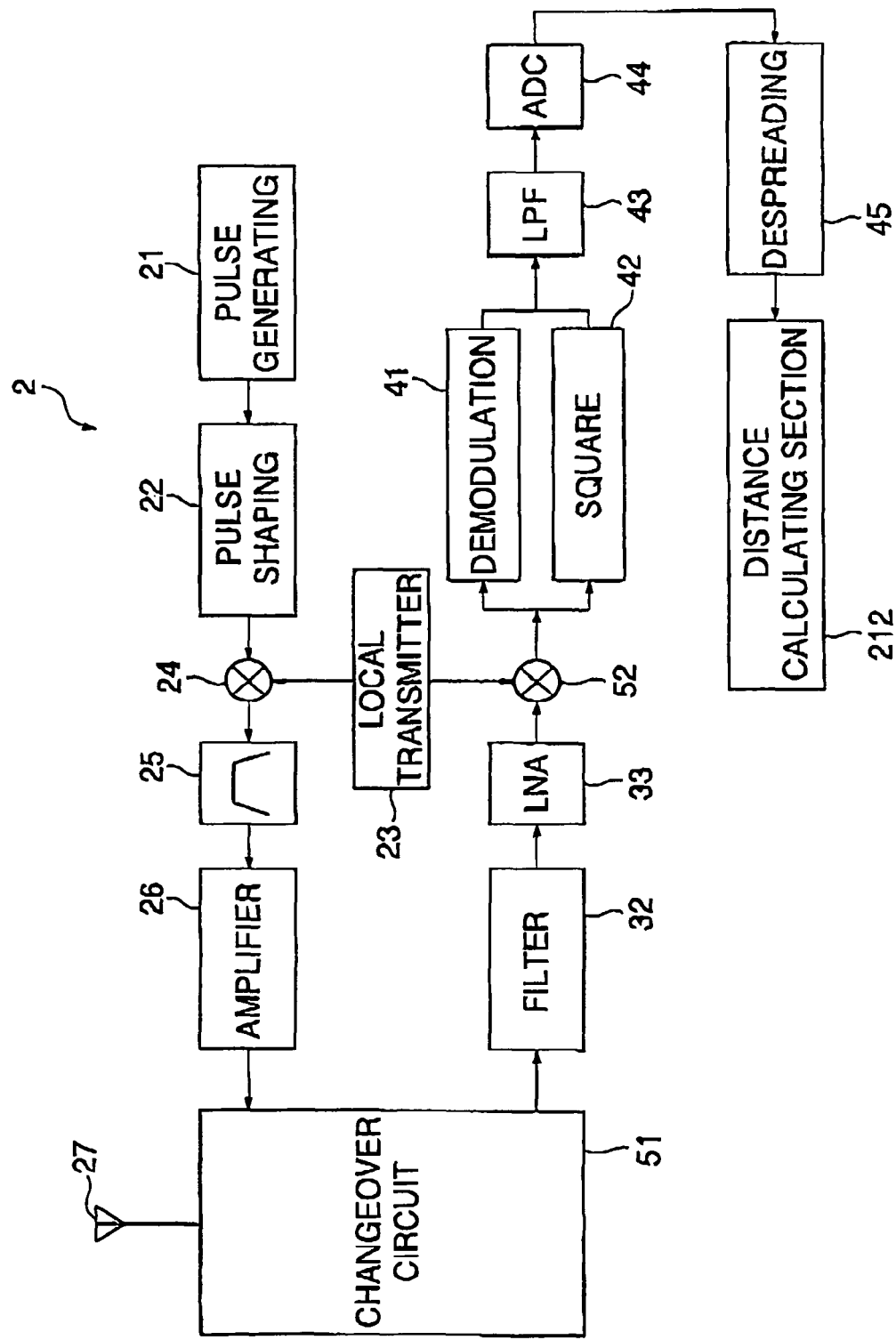
FIG. 3 is a block configurational diagram of a transmitting device constituting the distance measuring system to which the present invention is adapted.

FIG. 3 shows the detailed block structure of the transmitting device 2.

The transmitting device 2 has a pulse generating section 21 which generates a pulse signal based on UWB communication, a pulse shaping section 22 which is connected to the pulse generating section 21 and is supplied with the pulse signal generated by the pulse generating section 21, a mixer circuit 24 which performs frequency conversion of the pulse signal output from the pulse shaping section 22 based on a reference signal to be described later, a local transmitter 23 for supplying the generated reference signal to the mixer circuit 24, a filter 25 for limiting the pass band of the signal frequency-converted by the mixer circuit 24, an amplifier 26 connected to the filter 25, a changeover circuit 51 connected at least to the amplifier 26, and an antenna 27 connected to the changeover circuit 51.

The transmitting device 2 includes a filter 32 to which the pulse signal based on UWB communication received from the transmitting device 2 is sent via the antenna 27 and the changeover circuit 51, a low noise amplifier (LNA) 33 which performs a high-frequency signal process on a pulse sequence output from the filter 32, a mixer circuit 52 connected to the LNA 33, a demodulation circuit 41 which processes a coherent signal, a square circuit 42 for processing an noncoherent, a low-pass filter (LPF) 43 connected to the demodulation circuit 41 and the square circuit 42, an analog-digital converter (ADC) 44, and a de-spread circuit 45, which is connected to a distance calculating section 212.

The pulse generating section 21 generates pulse signals having a short time duration over a wide range of several GHz based on the UWB system. Incase of actually generating the pulse signals, the pulse generating section 21 sequentially generates a pulse sequence having pulse signals structured to have equal amplitudes and arranged at equal time intervals. The pulse sequence generated by the pulse generating section 21 is sent directly to the pulse shaping section 22.

The pulse shaping section 22 performs a predetermined shaping process on each pulse signal constituting the spread-based pulse sequence sent from the pulse generating section 21.

The local oscillator 23 generates a reference signal for modulation. The local oscillation frequency of the reference signal generated by the local oscillator 23 may be structured to be variable in the local transmitter 23. The local oscillation frequency to be generated by the local transmitter 23 may be controlled to be increased or decreased based on an unillustrated PLL circuit or the like.

The local oscillator 23 generates an in-phase signal (I signal) and an orthogonal signal (Q signal) as base band reference signals. The local oscillator 23 outputs the generated I signal to the mixer circuit 52.

The mixer circuit 24 performs frequency conversion on each pulse signal constituting the pulse sequence subjected to the shaping process in the pulse shaping section 22 based on the reference signal sent from the local transmitter 23. The mixer circuit 24 outputs the pulse sequence comprised of the pulse signal frequency-converted to the filter 25.

The filter 25 passes only a desired band of the UWB-based pulse sequence output from the mixer circuit 24, and cuts an unnecessary band. The pass band may be set in such a way that at this time, the filter 25 can remove an unnecessary frequency component which is generated at the time of frequency conversion in the mixer circuit 24. The pulse sequence having the band component which has passed the filter 25 is output directly to the amplifier 26.

The amplifier 26 amplifies the pulse sequence output from the filter 25, and performs correction to make the frequency characteristic flat in the band.

The changeover circuit 51 switches between the output of the signal to be transmitted to the return device 3 to the antenna 27 and the output of the signal transmitted from the return device 3.

The antenna 27 converts the pulse sequence having pulse signals as electric signals amplified by the amplifier 26 to a pulse sequence as an electromagnetic radio wave, and irradiates the pulse sequence in the air. The antenna 27 receives a pulse sequence returned as a radio wave from the return device 2, and converts the pulse sequence to a pulse sequence having electric pulse signals. It should be noted that the transmitting device 2 is preinstalled with a function of counting the time when the pulse sequence from the antenna 27 is irradiated as a radio wave, and a function of counting the time when the pulse sequence is received by the antenna 27.

The filter 32 removes a signal out of the UWB band from the pulse sequence received at the antenna 27. That is, because of a possible case where a signal out of the UWB band may be superimposed in the propagation process of a radio wave from the transmitting device 2 to the return device 3, such a signal is accurately removed by the filter 32.

The LNA 33 performs low noise amplification on the pulse sequence received at the antenna 27 and sent via the filter 32. The LNA 33 is installed to selectively amplify only a desired pulse signal based on the UWB system. The pulse sequence subjected to low noise amplification by the LNA 33 is supplied to the mixer circuit 52 connected thereto.

The mixer circuit 52 mixes each pulse signal constituting the pulse sequence sent from the LNA 33, with the I signal and Q signal output from the local oscillator 23, and outputs the mixed signal to the demodulation circuit 41. When the pulse sequence as a noncoherent signal is supplied, the pulse sequence is sent to the square circuit 42 to be subjected to a square process.

The demodulation circuit 41 demodulates a pulse sequence as a coherent signal based on the I signal and Q signal.

The LPF 43 removes a high-frequency component from the UWB pulse sequence as a coherent signal or noncoherent signal, and passes only the low-frequency component.

The ADC 44 digitizes the pulse signals of the analog base band sent from the LPF 43 by sampling the pulse signals, and sends the digitized pulse sequence to the de-spread circuit 45.

The de-spread circuit 45 performs a de-spread process on the input pulse signals with the waveform of a predetermined code being a template. The signal undergone the de-spread process is sent to the distance calculating section 212.

Figure 4:
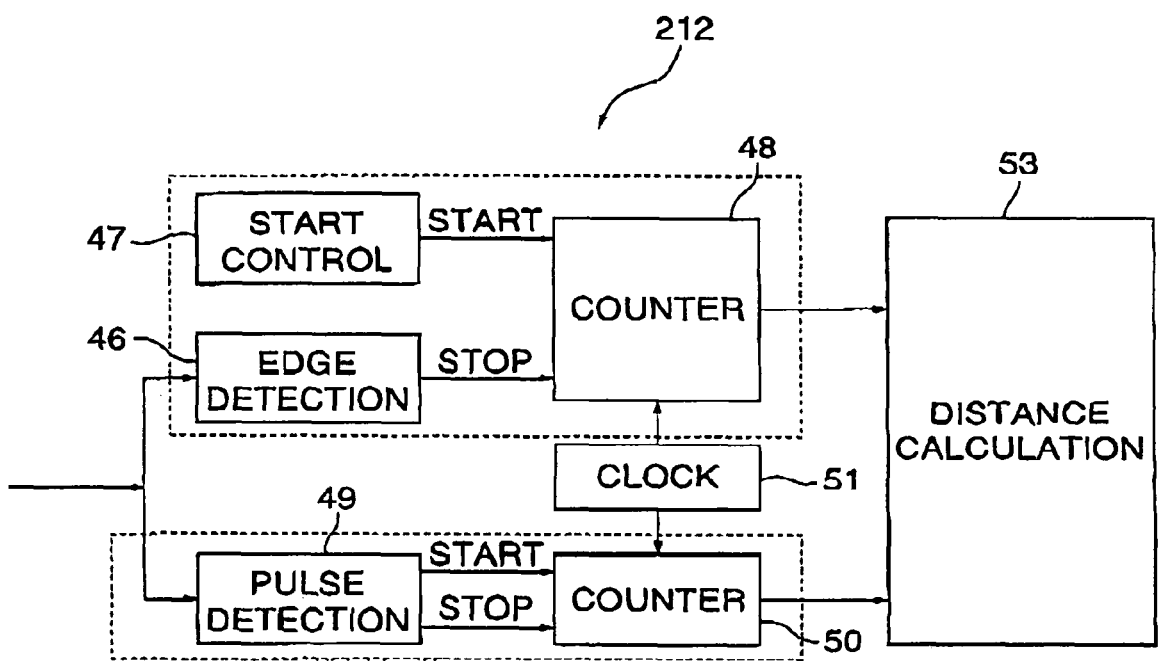
FIG. 4 is a diagram showing the block structure illustrating algorithm procedures in a distance calculating section.

FIG. 4 shows a block structure illustrating algorithm procedures in the distance calculating section 212.

The distance calculating block 212 is coupled to an edge detection block 46 and a pulse detection block 49. A counter 48 coupled to the edge detection block 46, and a start control block 47 connected to the counter 48 constitute a ranging counting for calculating a distance L, and the pulse detection block 49 and a counter 50 coupled thereto constitute an error detecting counter. The counters 48, 50 are coupled to a distance calculating block 53 and a clock 51.

The start control block 47 and the edge detection block 46 detect a pulse signal at that portion in a pulse sequence which forms a so-called preamble. FIG. 4 shows the frame structure of a pulse sequence to be detected by the start control block 47 and the edge detection block 46. The start control block 47 starts detecting a pulse signal positioned at the head of the frame. Then, the detection of the pulse signal is terminated under control of the edge detection block 46. It is to be noted that the start control block 47 starts detection from the first pulse signal after synchronization is established, and actually, a start command enables counting. The edge detection block 46 terminates the detection of the pulse signal when identifying an edge portion added to the pulse signal in the return device 2. That is, the edge detection block 46 detects pulse signals forming the area of Cr0 shown in FIG. 5. The counter 48 counts the detected pulse signals to acquire T4 in FIG. 2. The counter 48 is controlled by the clock 51 which has a precision of a high rate of GHz. The result of detecting the arrival time of a pulse signal by the counter 48 is notified to the distance calculating block 53.

Figure 5:
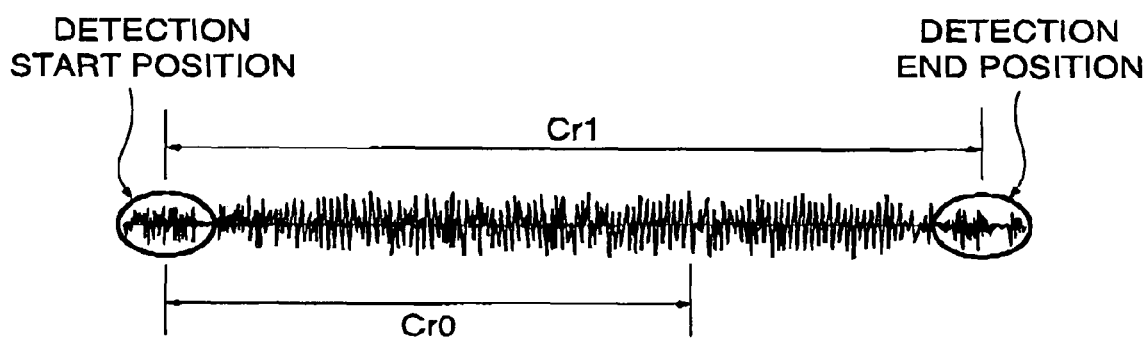
FIG. 5 is a diagram showing an example of a pulse sequence to be transmitted and received.

The pulse detection block 49 detects a pulse signal forming an area Cr1, shown in FIG. 5, in that portion in a pulse sequence which forms a so-called preamble. The pulse detection block 49 starts detection from the first pulse signal after establishment of synchronization, and keeps detecting pulse signals until a real data area following the preamble. The counter 50 detects the number of the pulse signals detected by the pulse detection block 49. The pulse sequence constituting the preamble, different from the real data portion, is an area having pulse signals regularly arranged. Therefore, with regard to the local oscillator 23 which actually produces a pulse sequence, a difference between relative times between the transmitting device 2 and the return device 3 can be acquired by counting the number of the pulse signals of the pulse sequence constituting the preamble. Hereinafter, with regard to the local oscillator 23 which generates pulse signals, the difference between relative times between the transmitting device 2 and the return device 3 is called relative time difference.

The distance calculating block 53 calculates $\Delta_t$ based on the equation (1), and calculates the actual distance L therefrom. At this time, the distance calculating block 53 corrects the distance L based on the relative time difference sent from the counter 50.

Although the foregoing description of the embodiment has been given with the transmitting device 2 taken as an example, the configurations in FIGS. 3 and 4 may be applied to the return device 3.

Figure 6:
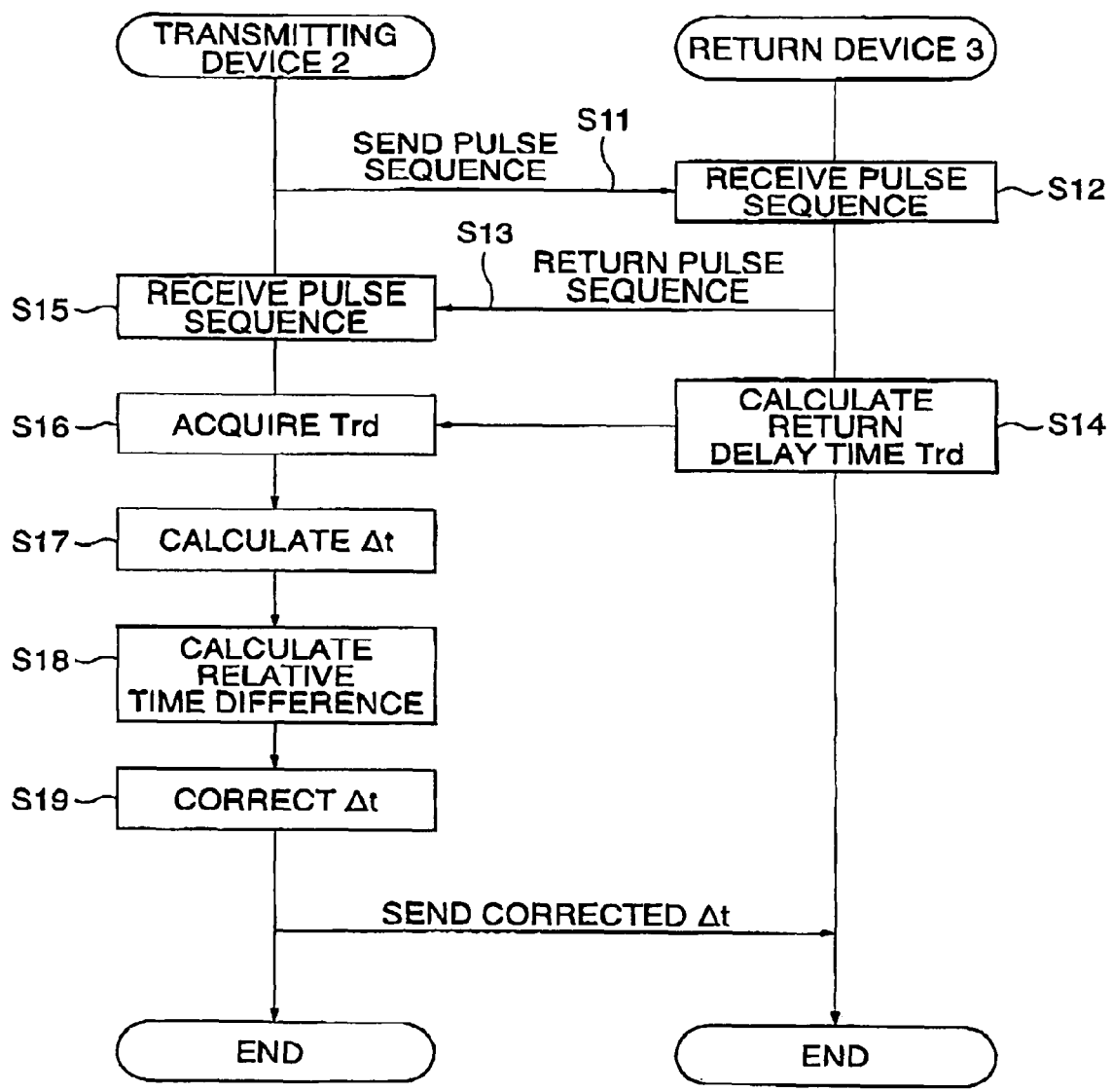
FIG. 6 is a flowchart for explaining a distance measuring method in the distance measuring system to which the present invention is adapted.

FIG. 6 shows the operation flow of the distance measuring system 1 to which the present invention is adapted.

First, in step S11, the transmitting device 2 sends a pulse sequence. The return device 3 receives the pulse sequence in step S12, and returns a pulse sequence to the transmitting device 2 in step S13. At this time, the return device 3 acquires a return delay time $T_{rd}$ in step S14.

The transmitting device 2 receives the pulse sequence transmitted from the return device 3 to measure a time $T_{ta}$ (=T4−T1) by means of the ranging counter in step S15. In step S16, a return delay time $T_{rd}$ transmitted from the return device 3 is acquired. Then, in step S17, $\Delta_t$ is calculated based on the equation (1). The transmitting device 2 acquires the relative time difference of the local oscillator 23 which generates a pulse signal via the error detecting counter. Then, the distance calculating block 53 corrects the calculated $\Delta_t$ in such a way as to reduce the acquired relative time difference (step S19). In step S20, the transmitting device 2 may transmit the corrected $\Delta_t$ to the return device 3 based on a request from the return device 3.

Let δr be the amount of the offset of the local oscillator 23 in the transmitting device 2, and δt be the amount of the offset of the local oscillator 23 in the return device 3.

When there is an offset amount δt in the return device 3, a measuring time T' for a packet constituting a pulse signal can be expressed by the following equation (2) with respect to a measuring time T when there is no offset amount δt.

$$T' = \frac{T}{1+\delta_t}. \quad (2)$$

Further, when the offset amount is δt in the oscillation device 2, the transmitting device 2 can express a measuring time $T^m$ by the following equation (3).

$$T^m = T'(1+\delta_r) = T\frac{1+\delta_r}{1+\delta_t}. \quad (3)$$

When δr, δt≪1, Taylor expansion of the equation (3) can yield the following equation (4).

$$\begin{aligned} T^m &= T\frac{1+\delta_r}{1+\delta_t} \\ &= T(1+\delta_r)(1-\delta_t+\delta_t^2+\dots) \\ &= T(1+\delta_r-\delta_t-\delta_t\delta_r+\dots) \end{aligned}$$

With high-order terms being neglected, the relative offset amount of the transmitting device 2 and the return device 3 can be approximated to the following equation (5).

$$\delta_r - \delta_t = \frac{T_{rd}^m}{T_{rd}} - 1. \quad (5)$$

A time Tta is given by the following equation (6).

$$T_{ta}^m = (T_{rd}'+2\Delta_t)(1+\delta_r) \quad (6)$$

$\Delta_t^m$ which is the calculated $\Delta_t$ corrected can be expressed by the following equation (7).

$$\begin{aligned} \Delta_t^m &= \frac{T_{ta}^m - T_{rd}^m}{2} \\ &= \Delta_t(1+\delta_r) + T_{rd}\frac{\delta_r-\delta_t}{2(1+\delta_t)} \end{aligned} \quad (7)$$

It is understood that the equation (7) is dominated by the difference between the value of the absolute offset amount, Trd, and the relative offset amount between oscillators.

Calculation of the distance L based on $\Delta_t^m$ expressed by the equation (7) can mitigate the time deviation (difference between offset amounts) between the local oscillator of the transmitting device 2 and the local oscillator of the return device 3.

The distance measuring system 1 to which the present invention is adapted acquires a relative time difference between the transmitting device 2 and the return device 3 with respect to the oscillator that generates pulse signals by counting the number of the pulse signals constituting the received pulse sequence, and corrects the calculated distance based on the relative time difference. This makes it possible to mitigate a time deviation (difference between offset amounts) between the local oscillator of the transmitting device 2 and the local oscillator of the return device 3, so that the measuring error can be reduced to the order of 1/10,000 with as smaller bands and less power as possible.

Figure 7:
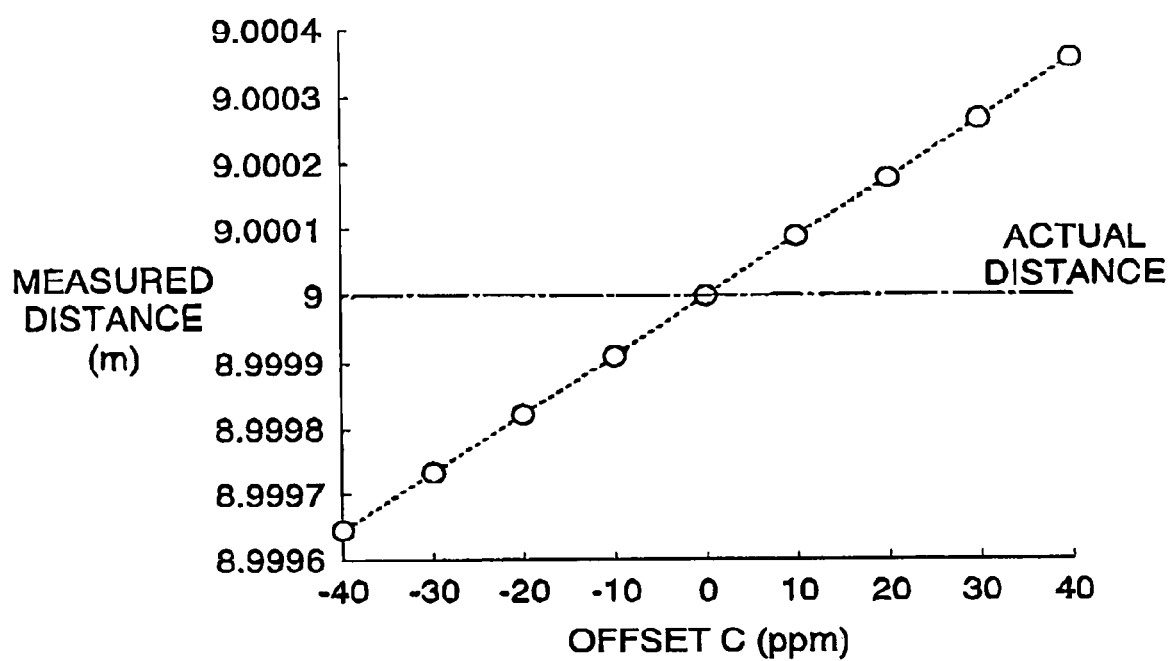
FIG. 7 is a diagram for explaining the advantages of the present invention.
Figure 8:
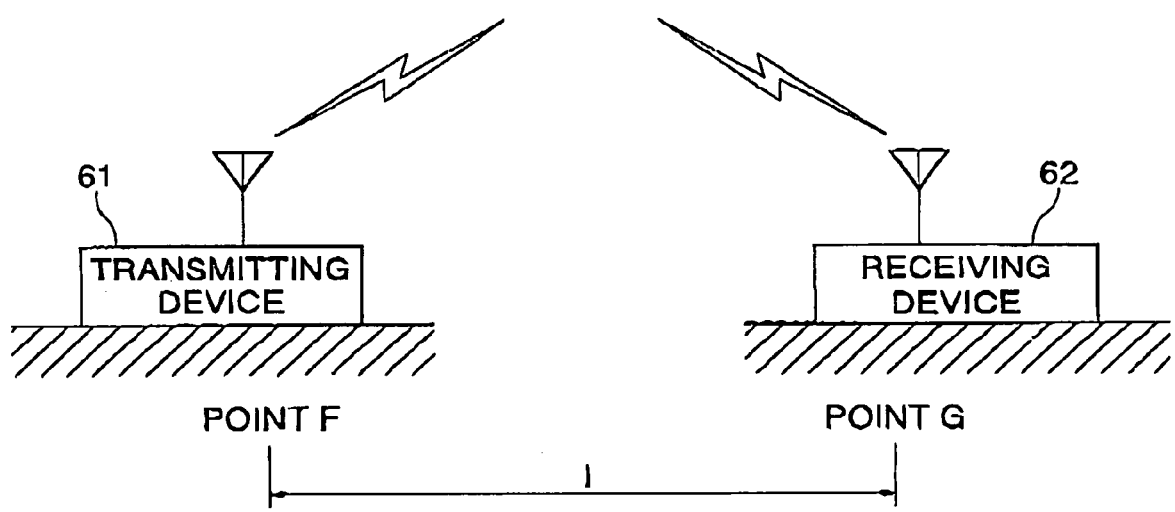
FIG. 8 is a diagram for explaining a related art.
Figure 9:
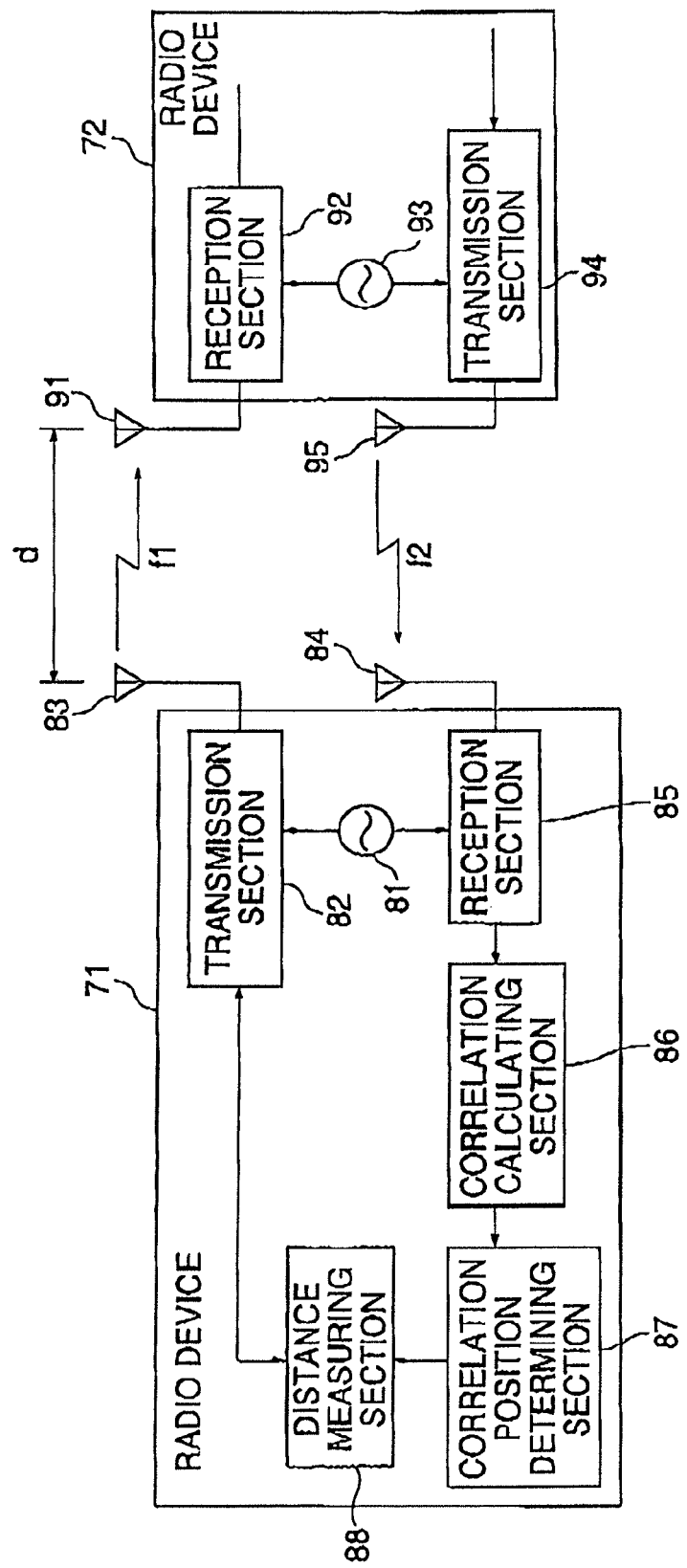
FIG. 9 is a block configurational diagram showing a conventional distance measuring system.
Figure 10:
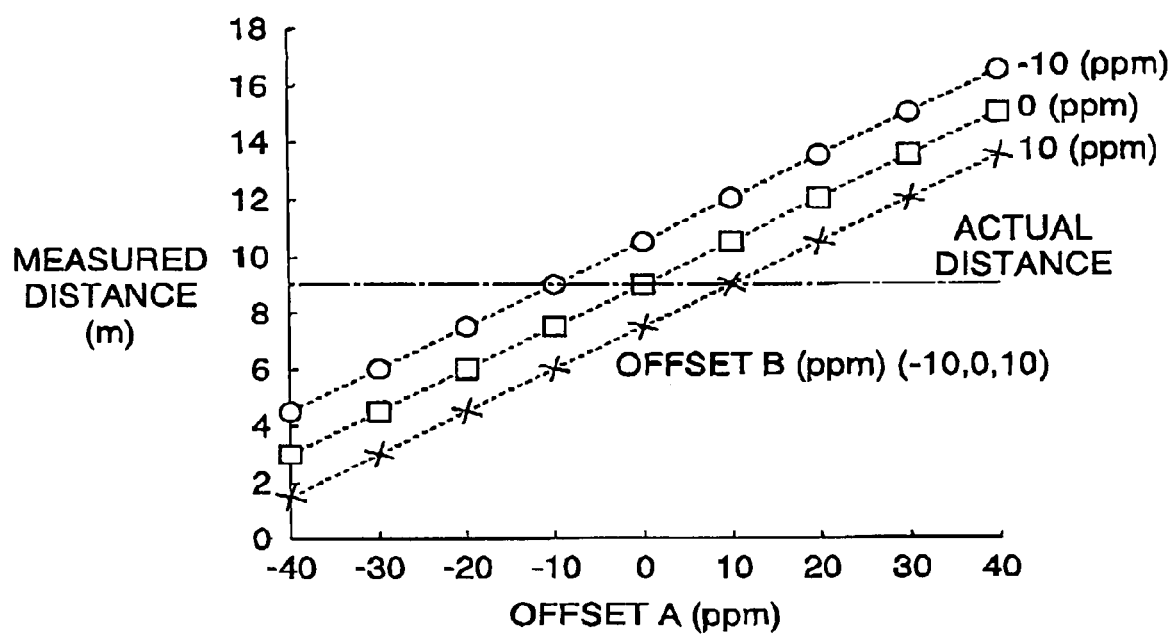
FIG. 10 is a diagram for explaining the problems of the conventional distance measuring system.

FIG. 7 shows a relative time difference (offset C) of the transmitting device 2 and the return device 3 on the abscissa, and a measuring error on the ordinate. It can be understood that the result of the simulation supports that the measuring error can be reduced to the order of 1/10,000 as compared with the conventional technique.

Although the foregoing description of the embodiment has been given of the case where UWB-based communication is performed, the present invention is not limited to such a configuration, and is of course be adaptable to a case where distance ranging based on another communication system is carried out.

DESCRIPTION OF THE REFERENCE NUMERALS

| | |
|---|---|
| 1 | distance measuring system |
| 2 | transmitting device |
| 3 | return device |
| 21 | pulse generating section |
| 22 | pulse shaping section |
| 23 | local transmitter |
| 24 | mixer circuit |
| 25 | filter |
| 26 | amplifier |
| 51 | changeover circuit |
| 27 | antenna |
| 32 | filter |
| 33 | low noise amplifier (LNA) |
| 52 | mixer circuit |
| 41 | demodulation circuit |
| 42 | square circuit |
| 43 | low-pass filter (LPF) 43 |
| 44 | analog-digital converter (ADC) 44 |
| 45 | despread circuit |
| 46 | edge detection block |
| 47 | start control block |
| 48 | counter |
| 49 | pulse detection block |
| 50 | counter |
| 51 | clock |
| 53 | distance calculating block |

The invention claimed is:

1. A distance measuring system comprising:
a transmitting device having transmission means that transmits a pulse sequence as a radio wave, and reception means that receives the pulse sequence returned; and
a return device having return means that receives the pulse sequence transmitted as a radio wave from the transmitting device and returns the pulse sequence to the transmitting device, operation means that calculates a return delay time from reception of the pulse sequence to returning of the pulse sequence, and notification means that notifies the transmitting device of the return delay time calculated by the operation means,
and further including:
relative time difference calculating means that acquires a relative time difference between the transmitting device and the return device for an oscillator which generates the pulse signals by counting a number of pulse signals constituting the pulse sequence received via the reception means; and
distance calculating means that acquires an arrival time from transmission of one pulse signal constituting the pulse sequence by the transmission means to reception of the pulse signal by the reception means, calculates a distance from the return device based on the return delay time notified by the notification means and the acquired arrival time, and corrects the calculated distance based on the relative time difference calculated by the relative time difference calculating means.

2. The distance measuring system according to claim 1, wherein the transmission means transmits a pulse sequence based on a UWB (Ultra Wide Band) communication protocol.

3. A distance measuring system comprising:
a transmitting device having a transmitter that transmits a pulse sequence as a radio wave, and a receiver that receives the pulse sequence returned;
a return device having a return device receiver that receives the pulse sequence transmitted as a radio wave from the transmitting device and returns the pulse sequence to the transmitting device, an operation component that calculates a return delay time from reception of the pulse sequence to returning of the pulse sequence, and a notification component that notifies the transmitting device of the return delay time calculated by the operation component;
a relative time difference calculator that acquires a relative time difference between the transmitting device and the return device for an oscillator which generates the pulse signals by counting a number of pulse signals constituting the pulse sequence received via the receiver; and
a distance calculator that acquires an arrival time from transmission of one pulse signal constituting the pulse sequence by the transmitter to reception of the pulse signal by the receiver, calculates a distance from the return device based on the return delay time notified by the notification component and the acquired arrival time, and corrects the calculated distance based on the relative time difference calculated by the relative time difference calculator.

4. The distance measuring system according to claim 3, wherein the transmitter transmits a pulse sequence based on a UWB (Ultra Wide Band) communication protocol.

* * * * *